Figures 1, 2, 3:
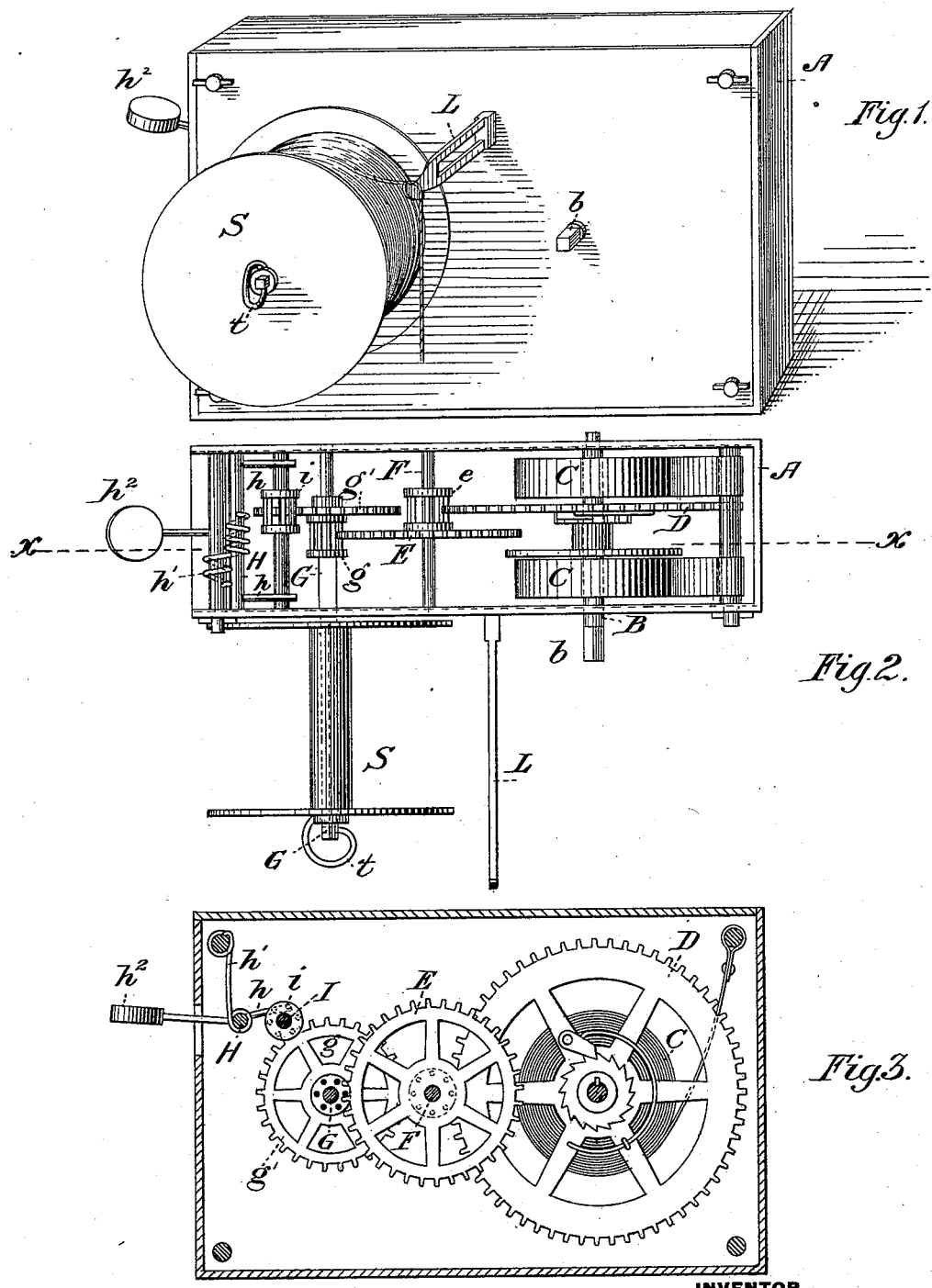

(No Model.)

C. FLEMING, Jr.
AUTOMATIC TWINE WINDER.

No. 400,203. Patented Mar. 26, 1889.

WITNESSES:
R. C. Duncan,
C. M. Clarke

INVENTOR,
Cochran Fleming Jr.
by H. P. Potter Att'y.

UNITED STATES PATENT OFFICE.

COCHRAN FLEMING, JR., OF SEWICKLEY, PENNSYLVANIA.

AUTOMATIC TWINE-WINDER.

SPECIFICATION forming part of Letters Patent No. 400,203, dated March 26, 1889.

Application filed April 23, 1888. Serial No. 271,582. (No model.)

*To all whom it may concern:*

Be it known that I, COCHRAN FLEMING, Jr., of Sewickley, county of Allegheny, State of Pennsylvania, have invented or discovered a new and useful Improvement in Automatic Twine-Winders; and I do hereby declare the following to be a full, clear, concise, and exact description thereof, reference being had to the accompanying drawings, making a part of this specification, in which—like letters indicating like parts—

Figure 1 is a view in perspective of my automatic twine-winder. Fig. 2 is a plan view of the same with the inner parts exposed to show the arrangement of the driving mechanism. Fig. 3 is a side elevation, also showing the mechanism, taken in the line $x\,x$ of Fig. 2.

My invention has for its object the provision of means for securing and retaining in neat and convenient form twine for use in tying up parcels or for any of the numerous purposes for which twine is commonly called into play.

It is designed for use in stores and also in dwelling-houses or in any place where it is desirable to have twine in readiness for instant use.

Another object of my invention is to afford means for saving the short bits of twine that are constantly brought into a house, and which, for want of a convenient place to keep them until wanted, are usually lost.

In order that others may fully understand the construction and operation of my device, I will proceed to describe it in detail in connection with the drawings.

A represents a suitable casing containing a spring-motor and a train of gearing—such as is used in an ordinary clock—and consisting of a main shaft, B, with projecting key end $b$. On this main shaft are mounted main springs $c\,c$ and spur-wheel D, gearing into small wheel $e$ on shaft F. On this same shaft, F, is mounted spur-wheel E, which in turn engages small wheel $g$ on winding-shaft G. The escapement is regulated by arms $h\,h$ of shaft H, governed by spring $h'$, and provided with button $h^2$, and bearing on shaft I, which has small wheel $i$, meshing into wheel $g'$ on shaft G. Shaft G projects beyond the casing, and is made square and fitted to receive the spool S, which is secured thereon by wire ring $t$. I also provide cutter-bar L, attached to the side of the casing in position to receive the twine, which runs through a transverse aperture, acting as a guide, by means of which the twine is evenly wound upon the spool. The cutter-bar L is also sharpened to a knife-edge at the outer end, and the twine being given a turn or two around the body of the bar to hold it firmly may be easily cut off at any desired length by drawing it sharply across the knife-edge of the bar.

The operation of my device is as follows: The spring-motor is first wound up by applying a key to $b$. The pressure of the spring by means of the train of gearing upon the shaft G and its spool or reel mounted thereon tends to wind up the twine attached thereto. The pressure of the arms $h\,h$ upon shaft I acts as a brake and prevents it from turning, except when pressure upon the thumb-rest or button $h^2$ releases it, so that when it is desired to have the twine wound upon the reel all that is necessary is to press upon the button $h^2$ and the reel is at once put in motion. This motion, of course, tends to run the motor down, but the pulling out of the twine in process of use reverses the motion and winds up the motor again, so that one winding by the key will last a long time.

I am aware that a twine-winder has been provided with a ratchet and pawl to control the movement of the winding-reel, and this I do not claim.

Having thus described my improvement, I claim herein and desire to secure by Letters Patent—

The combination, with the casing having a spool detachably connected to one side, of the cutter-bar rigidly secured to the same side as the spool and having a transverse aperture in its body portion and a knife-edge at one end thereof, whereby the twine is evenly wound upon the spool and cut as required, substantially as specified.

In testimony whereof I have hereunto set my hand.

COCHRAN FLEMING, JR.

Witnesses:
CHAS. WILCOX,
R. C. DUNCAN.